(12) United States Patent
Kim

(10) Patent No.: US 7,441,798 B2
(45) Date of Patent: Oct. 28, 2008

(54) CURTAIN AIRBAG DEVICE FOR CAR

(75) Inventor: Dong Jun Kim, Yongin-shi (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 11/305,131

(22) Filed: Dec. 19, 2005

(65) Prior Publication Data

US 2007/0035115 A1   Feb. 15, 2007

(30) Foreign Application Priority Data

Aug. 9, 2005   (KR) .................. 10-2005-0073016

(51) Int. Cl.
*B60R 21/16* (2006.01)

(52) U.S. Cl. .................................. 280/730.2

(58) Field of Classification Search ............. 280/730.2, 280/736, 740, 742
See application file for complete search history.

(56) References Cited

U.S. PATENT DOCUMENTS

| | | | |
|---|---|---|---|
| 6,378,895 B1 * | 4/2002 | Brucker et al. ........... | 280/730.2 |
| 6,729,645 B2 * | 5/2004 | Amamori ................. | 280/730.2 |
| 6,877,769 B2 | 4/2005 | Kim et al. | |
| 6,877,771 B2 * | 4/2005 | Weber ....................... | 280/742 |
| 2006/0220356 A1 * | 10/2006 | Baekelandt ............. | 280/730.2 |
| 2006/0255579 A1 * | 11/2006 | Wallner et al. ............ | 280/740 |
| 2007/0013178 A1 * | 1/2007 | Aird .......................... | 280/740 |

* cited by examiner

*Primary Examiner*—Faye M. Fleming
(74) *Attorney, Agent, or Firm*—Greenblum & Bernstein, P.L.C.

(57) ABSTRACT

A curtain airbag device for a car is provided. A fill hose formed with a plurality of gas discharge openings is installed within a cushion so that compressed gas generated from an inflator can be supplied into the cushion, and there is provided with a guide that guides the flow of the compressed gas in the fill hose to be bent toward the gas discharge openings of the fill hose with respect to the longitudinal direction of the fill hose, thereby smoothly emitting the compressed gas in the fill hose into the cushion via the gas discharge openings of the fill hose.

4 Claims, 3 Drawing Sheets

PRIOR ART

CURTAIN AIRBAG DEVICE FOR CAR

This nonprovisional application claims priority under 35 U.S.C. §119(a) on patent application Ser. No. 10-2005-73016 filed in Korea on Aug. 9, 2005, the entire contents of which are hereby incorporated by reference.

BACKGROUND OF THE INVENTION

1. Field of the Invention

The present invention relates to a curtain airbag device for a car, and more particularly, to a curtain airbag device for a car which can advance the point of time at which a cushion is fully deployed by smoothly supplying gas into the cushion from a fill hose.

2. Description of the Conventional Art

Recently, people are getting more and more interested in safety in car accidents as well as functionality and convenience of a car and putting more importance on it. As a result, the current tendency is that various kinds of safety devices are provided at a car.

Generally, an airbag system is a safety device for a passenger, which is for minimizing the risk of the passenger being injured, caused by directly hit with a car structure, by expanding an airbag between the passenger and the car structure at a car crash.

Such an airbag system is installed at each region of a car according to needs, and is classified into a driver seat airbag device mounted within a steering wheel for protecting a passenger sitting on the driver seat in the upper body and head at head-on collision, a front passenger seat airbag device mounted on the upper side of a globe box for protecting a passenger sitting on the front passenger driver seat, and a curtain airbag device installed in the sides of a car for protecting a passenger, being expanded between the passenger and the doors at a side collision.

The curtain airbag is installed along the roof rail of a car, which is for preventing a passenger from falling out of the car by protecting the passenger in the head at a side collision or in a turnover accident after a side collision.

FIG. 1 is a cross sectional view of a curtain airbag according to the conventional art.

The curtain airbag device for a car according to the conventional art includes: a cushion 102 longitudinally installed along a roof rail and being expandable between a passenger and the car door when the internal pressure increases; an inflator 104 connected to the cushion 102 and for supplying compressed gas into the cushion 102 so as to increase the internal pressure of the cushion 102 at a side collision; and a fill hose 106 longitudinally installed within the cushion 102 along the roof rail, connected to the inflator 104 and for guiding the compressed gas generated in the inflator 104 into the cushion 102.

The fill hose 106 is constructed in a manner that one end is connected to the inflator 104 and the other end is blocked, and a plurality of gas discharge openings 120, 122 and 124 is formed at regular intervals in a longitudinal direction of the fill hose 106 so that the compressed gas in the fill hose 106 can be emitted into the cushion 102.

The gas discharge openings 120, 122 and 124 of the fill hose 106 includes a first group gas discharge opening 120 formed nearest to the inflator 104, a second group gas discharge opening 122 placed in the middle of the fill hose 106, and a third group gas discharge opening 124 formed at the tip end portion of the fill hose 106.

Such a fill hose 106 is formed from fabric and rubber. When the compressed gas of the inflator 104 is supplied thereinto, the volume of the fill hose 106 is changed to a round bar type.

The operation of the thus-constructed curtain airbag device for the car according to the conventional art will now be described.

In the event of a side collision of a vehicle, as the inflator 104 bursts according to a signal applied from a collision sensor, the compressed gas stored in the inflator 104 is supplied into the fill hose 106. Then, as the volume of the fill hose 106 is changed to a round bar type, the compressed gas is supplied into the cushion 102 through the plurality of gas discharge openings 120, 122 and 124 formed on the fill hose 106. Thus, the cushion 102 is expanded, thereby protecting a passenger.

However, in the thus-constructed curtain airbag device for the car according to the conventional art, when the compressed gas is supplied to the fill hose 106, the volume of the fill hose 106 is changed to a round bar type, and the gas discharge openings 120, 122 and 124 are formed perpendicular to the direction of gas flow. Therefore, the compressed gas in the fill hose 106 is not smoothly emitted into the cushion 102, and accordingly, the full deployment time of the cushion 102 is delayed, thereby being unable to safely protect the passenger.

Especially, the flow rate of the compressed gas in the fill hose 106 is very high at the inlet region of the fill hose 106 adjacent to the inflator 104. Hence, the compressed gas in the fill hose 106 is not relatively more emitted from the first group gas discharge openings 120 of the fill hose 106. Consequently, the cushion 102 may be eccentrically expanded.

SUMMARY OF THE INVENTION

The present invention is devised to solve the conventional problems described above, and it is an object of the present invention to provide a curtain airbag device for a car which can advance the point of time at which a cushion is fully deployed by smoothly supplying compressed gas in a fill hose into a cushion by having a guide means for bending the compressed gas in the fill hose transferred from an inflator toward gas discharge openings of the fill hose with respect to a longitudinal direction of the fill hose.

To accomplish the above object, there is provided a curtain airbag device for a car according to the present invention, comprising: a cushion installed to a car body and expanded between a passenger and the car when the internal pressure increases; an inflator for supplying compressed gas to the cushion in the event of a car collision; a fill hose mounted within the cushion to connect with the inflator and formed with a plurality of gas discharge openings for supplying the compressed gas generated from the inflator into the cushion; and a guide means for guiding the flow of the compressed gas in the fill hose to be bent toward the gas discharge openings of the fill hose with respect to a longitudinal direction of the fill hose.

The gas discharge openings of the fill hose includes a first group gas discharge opening formed at the inlet of the fill hose, a second group gas discharge opening formed at the center of the fill hose, and a third group discharge opening formed at the end portion of the fill hose.

The guide means is provided at the inlet region of the fill hose where the first group gas discharge opening of the fill hose is formed.

The guide means is formed by bending the region where the gas discharge opening of the fill hose is formed, so that the compressed gas in the fill hose can be smoothly emitted to the gas discharge openings of the fill hose.

The bending region of the fill hose is maintained in shape by a non-expanding area of the cushion.

The non-expanding area of the cushion includes a first stopping portion placed at the upper side of the bending region of the fill hose and a second stopping portion placed at a side of the bending region of the fill hose.

The bending region of the fill hose is provided in a U-shape by the non-expanding area of the cushion.

The bending region of the fill hose is bent downward from the fill hose.

The cushion is provided with a non-expanding area for supporting the guide means.

The non-expanding area of the cushion includes a first stopping portion placed at the upper side of the guide means and a second stopping portion placed at a side of the guide means.

To accomplish the above object, there is provided another curtain airbag device for a car according to the present invention, comprising: a cushion installed to a car body and expanded between a passenger and the car when the internal pressure increases; an inflator for supplying compressed gas to the cushion in the event of a car collision; a fill hose mounted within the cushion to connect with the inflator and formed with a plurality of gas discharge openings, at least some parts of the region where the gas discharge openings are formed being bent.

The gas discharge openings of the fill hose includes a first group gas discharge opening formed at the inlet of the fill hose, a second group gas discharge opening formed at the center of the fill hose, and a third group discharge opening formed at the end portion of the fill hose.

The fill hose is bent at the inlet region of the fill hose where the first group gas discharge opening is formed.

The bending region of the fill hose is bent downward from the fill hose.

The bending region of the fill hose is maintained in shape by a non-expanding area of the cushion.

The non-expanding area of the cushion includes a first stopping portion placed at the upper side of the bending region of the fill hose and a second stopping portion placed at a side of the bending region of the fill hose.

The bending region of the fill hose is provided in a U-shape by the non-expanding area of the cushion.

To accomplish the above object, there is provided another curtain airbag device for a car according to the present invention, comprising: a cushion installed to a car body and expanded between a passenger and the car when the internal pressure increases; an inflator for supplying compressed gas to the cushion in the event of a car collision; a fill hose mounted within the cushion to connect with the inflator and formed with a plurality of gas discharge openings in order from the inflator side, an inlet region were the first group gas discharge opening is formed being bent downward and the bending region being maintained in shape by a non-expanding area of the cushion.

The non-expanding area of the cushion includes a first stopping portion placed at the upper side of the bending region of the fill hose and a second stopping portion placed at a side of the bending region of the fill hose.

The bending region of the fill hose is provided in a U-shape by the non-expanding area of the cushion.

The thus-constructed curtain airbag device for a car according to the present invention can advance the point of time at which a cushion is fully deployed by smoothly supplying compressed gas in a fill hose into a cushion by having a guide means for bending the compressed gas in the fill hose transferred from an inflator toward gas discharge openings of the fill hose with respect to a longitudinal direction of the fill hose, thereby improving the functions.

Furthermore, in the curtain airbag device for a car according to the present invention, the guide means is easily applicable and has almost no effect on cost, weight, volume, etc. because the guide means can be implemented by bending the region where the gas discharge openings of the fill hose are formed.

Furthermore, in the curtain airbag device for a car according to the present invention, the guide means is easily applicable and has almost no effect on cost, weight, volume, etc. because the shape of the guide means can be simply maintained by the non-expanding area of the cushion.

Furthermore, the curtain airbag device for a car according to the present invention can prevent the eccentric expansion of the cushion by having the guide means at the inlet region of the fill hose.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENTS

Preferred embodiment of a curtain airbag device for a car according to the present invention will now be described with reference to the accompanying drawings.

There may exist a plurality of embodiments of a curtain airbag device for a car according to the present invention. Hereinafter, the most preferred embodiment will be described. However, since the basic structure of the curtain airbag device for a car is identical to that of the conventional art, a detailed description thereof will be omitted.

Hereinafter, embodiments of the present invention will now be described in detail with reference to the accompanying drawings.

Figure 1:
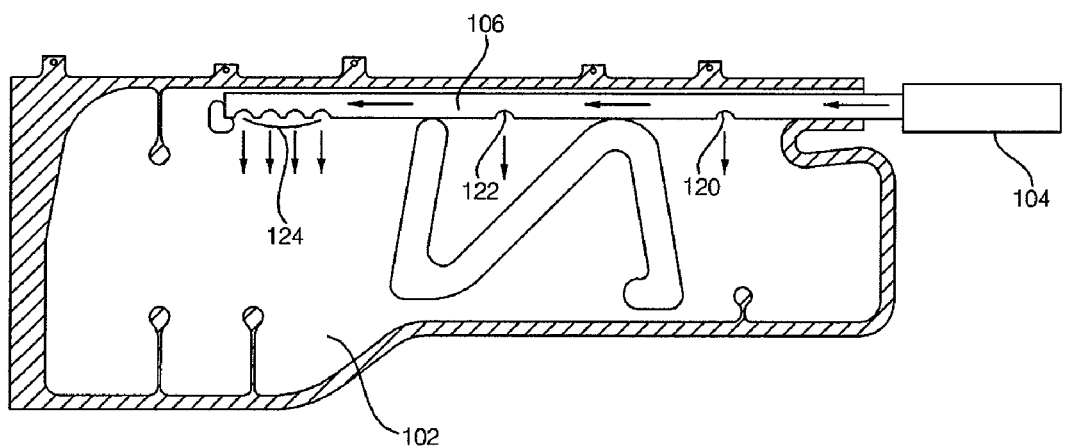
FIG. 1 is a cross sectional view of a curtain airbag according to the conventional art.
Figure 2:
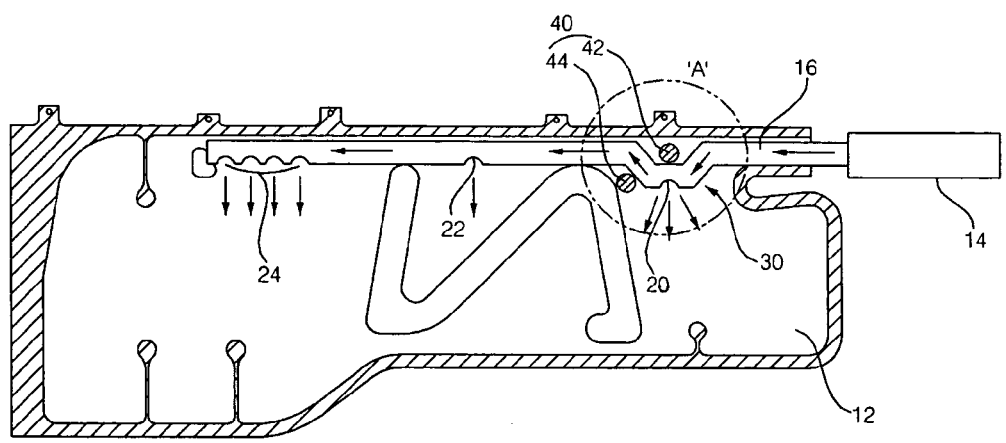
FIG. 2 is a cross sectional view of a curtain airbag device according to the present invention.
Figure 3:
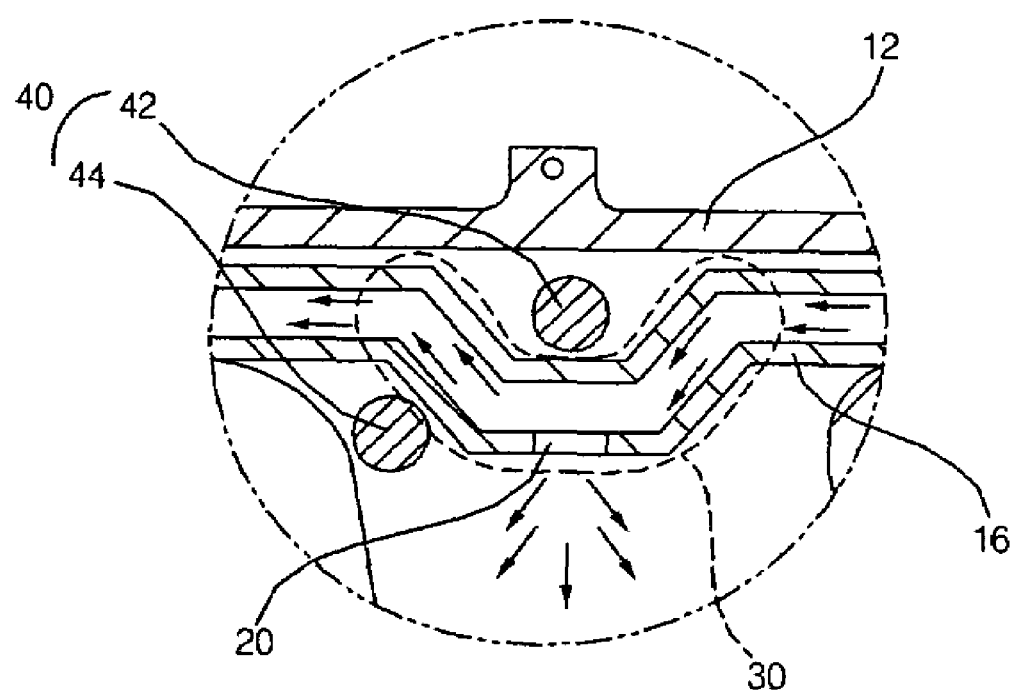
FIG. 3 is an extended view of part A of FIG. 2.

FIG. 2 is a cross sectional view of a curtain airbag device according to the present invention. FIG. 3 is an extended view of part A of FIG. 2.

The curtain airbag device for a car according to the present invention includes: a cushion 12 installed in a folded state along a roof rail of a car body and being expandable between a passenger and the car door when the internal pressure increases; an inflator 14 installed to one side of the cushion 12 and for supplying compressed gas into the cushion 12 so as to increase the internal pressure of the cushion 12 at a side collision; and a fill hose 16 mounted within the cushion 12 in a longitudinal direction along the roof rail, connected to the inflator 14 and for supplying the compressed gas generated in the inflator 14 into the cushion 12.

The fill hose 16 is constructed in a manner that one end is connected to the inflator 14 and the other end is blocked, and a plurality of gas discharge openings 20, 22 and 24 is formed sequentially in a longitudinal direction thereof so that the compressed gas flowing in the fill hose 16 can be emitted into the cushion 12.

The gas discharge openings 20, 22 and 24 of the fill hose 16 includes a first group gas discharge opening 20 formed at the inlet of the fill hose 16 nearest to the inflator 14, a second group gas discharge opening 22 formed in the middle of the fill hose 18, and a third group gas discharge opening 24 formed at the end portion of the fill hose 16.

Meanwhile, the curtain airbag device for a car according to the present invention further includes a guide means (or guide) for guiding the flow of the compressed gas in the fill hose 16 to be bent toward the gas discharge openings 20, 22 and 24 of the fill hose 16 with respect to a longitudinal direction of the fill hose 16, 50 that the compressed gas in the fill hose 16 can be smoothly emitted into the cushion 12 via the gas discharge openings 20, 22 and 24 of the fill hose 16.

The guide means is applicable to all of the regions where the first, second and third gas discharge openings 20, 22 and 24 of the fill hose 16 are formed, however, in this embodiment, the guide means is applied only to the inlet region of the fill hose 16 where the first group gas discharge opening 20 having a relatively high gas flow rate is formed adjacent to the inflator 14.

The guide means (or guide) can be implemented (or formed) by bending the inlet region of the fill hose 16 where the first group gas discharge opening 20 of the fill hose 16 is formed in a manner that the flow of the compressed gas in the fill hose 16 is changed and smoothly emitted into the first group gas discharge opening 20. Hereinafter, the bending region of the fill hose 16 for implementing the guide means is referred to as a bending portion 30.

The bending portion 30 may be provided in such a structure in which the inlet region where the first group gas discharge opening 20 of the fill hose 16 is formed is bent downward in a U-shape with respect to the fill hose 16 and the first group gas discharge opening 20 of the fill hose 16 is placed at the peak region of the bending.

The bending portion 30 can be maintained in shape by having a non-expanding area 40 at one region of the bending portion 30 of the cushion 12.

The non-expanding area 40 of the cushion 12 may includes a first stopping portion 42 placed at the upper side of the bending portion 30 so that the bending portion 30 can be pressed down from the fill hose 16 and a second stopping portion 44 placed at a side of the bending portion 30.

That is, the fill hose 16 is formed from fabric and rubber. Thus, when the compressed gas of the inflator 14 is supplied thereinto, the volume of the fill hose 16 is changed to a round bar type. The region where the first group gas discharge opening 20 of the fill hose 16 is formed is guided by the first stopping portion 42 and the second stopping portion 44, thereby forming the bending portion 30 of an approximately U-shape.

The non-expanding area 40 of the cushion 12 can be formed by sewing a predetermined area so that it may not inflate even if gas is supplied into the cushion 12.

The operation of the thus-constructed curtain airbag device for the car according to the conventional art will now be described.

In the event of a side collision of a vehicle, as the inflator 14 bursts according to a signal applied from a collision sensor, the compressed gas stored in the inflator 14 is introduced into the fill hose 16.

The gas passing through the fill hose 16 is emitted into the cushion 12 via the first group gas discharge opening 20, second group gas discharge opening 22 and third group gas discharge opening 24 formed on the fill hose 16. Accordingly, as the cushion is expanded between a passenger and the car door, thereby protecting the passenger from the side collision of the vehicle.

Here, when the gas is supplied into the fill hose 16, the volume of the fill hose 16 is changed to a round bar type. At the region where the first group gas discharge opening 20 of the fill hose 16 is formed, the bending portion 30 is formed by the first stopping portion 30 and the second stopping portion 42. Hence, the compressed gas at the side of the first group gas discharge opening 20 of the fill hose 16 in the fill hose 16 is guided into the first group gas discharge opening 20 of the fill hose 16 by the bending portion 30, thereby smoothly emitting the compressed gas in the fill hose 16 into the cushion 12 via the first group gas discharge opening 20 of the fill hose 16.

As described above in detail, the curtain airbag device for a car according to the present invention can advance the point of time at which a cushion is fully deployed by smoothly supplying compressed gas in a fill hose into a cushion by having a guide means for bending the compressed gas in the fill hose transferred from an inflator toward gas discharge openings of the fill hose with respect to a longitudinal direction of the fill hose, thereby safely protecting a passenger and improving the functions.

Furthermore, in the curtain airbag device for a car according to the present invention, the guide means is easily applicable and has almost no effect on cost, weight, volume, etc. because the guide means can be implemented by bending the region where the gas discharge openings of the fill hose are formed.

Furthermore, in the curtain airbag device for a car according to the present invention, the guide means is easily applicable and has almost no effect on cost, weight, volume, etc. because the shape of the guide means can be simply maintained by the non-expanding area of the cushion.

Furthermore, the curtain airbag device for a car according to the present invention can prevent the eccentric expansion of the cushion by having the guide means at the inlet region of the fill hose.

What is claimed is:

1. A curtain airbag for a car, the curtain airbag comprising:
a cushion configured to be installed in a car body, wherein the cushion is expandable between a passenger and the car when the internal pressure within the cushion increases;
an inflator configured to supply compressed gas to the cushion so as to expand the cushion;
a fill hose provided within the cushion and in communication with the inflator, wherein the fill hose is formed having a plurality of gas discharge openings configured to supply the compressed gas supplied by the inflator into the cushion; and
a guide that guides the flow of the compressed gas in the fill hose to be bent toward the gas discharge openings of the fill hose with respect to a longitudinal direction of the fill hose,
wherein the guide is provided as a bending region of the fill hose,
wherein the guide is formed by bending the region where the gas discharge opening of the fill hose is formed, so that the compressed gas in the fill hose can be smoothly emitted through the gas discharge openings of the fill hose,
wherein a shape of the bending region of the fill hose is maintained by a non-expanding area of the cushion, and
wherein the non-expanding area of the cushion includes a first stopping portion positioned at an upper side of the bending region of the fill hose and a second stopping portion positioned at a side of the bending region of the fill hose.

2. A curtain airbag for a car, the curtain airbag comprising:

a cushion configured to be installed in a car body, wherein the cushion is expandable between a passenger and the car when the internal pressure within the cushion increases;

an inflator configured to supply compressed gas to the cushion so as to expand the cushion;

a fill hose provided within the cushion and in communication with the inflator, wherein the fill hose is formed having a plurality of gas discharge openings configured to supply the compressed gas supplied by the inflator into the cushion; and a guide that guides the flow of the compressed gas in the fill hose to be bent toward the gas discharge openings of the fill hose with respect to a longitudinal direction of the fill hose, wherein the guide is provided as a bending region of the fill hose, wherein the cushion is provided with a non-expanding area which supports the guide, and wherein the non-expanding area of the cushion includes a first stopping portion positioned at an upper side of the guide and a second stopping portion positioned at a side of the guide.

3. A curtain airbag for a car, the curtain airbag comprising:

a cushion configured to be installed in a car body, wherein the cushion is expandable between a passenger and the car when the internal pressure within the cushion increases;

an inflator configured to supply compressed gas to the cushion so as to expand the cushion; and a fill hose provided within the cushion and in communication with the inflator, wherein the fill hose is formed having a plurality of gas discharge openings configured to supply the compressed gas to the cushion, wherein at least some parts of the region where the gas discharge openings are formed being bent so as to provide a bending region of the fill hose, and wherein a non-expanding area of the cushion includes a first stopping portion positioned at an upper side of the bending region of the fill hose and a second stopping portion positioned at a side of the bending region of the fill hose.

4. A curtain airbag for a car, the curtain airbag comprising:

a cushion configured to be installed in a car body, wherein the cushion is expandable between a passenger and the car when the internal pressure within the cushion increases;

an inflator configured to supply compressed gas to the cushion so as to expand the cushion; and a fill hose provided within the cushion and in communication with the inflator, wherein the fill hose is formed having a plurality of gas discharge openings comprising a first gas discharge provided at an inlet region, the inlet region including a downwardly bending region of the fill hose, wherein a shape of the bending region is maintained by a non-expanding area of the cushion, and wherein the non-expanding area of the cushion includes a first stopping portion positioned at an upper side of the bending region of the fill hose and a second stopping portion positioned at a side of the bending region of the fill hose.

* * * * *